US012618977B2

(12) United States Patent
Rudow et al.

(10) Patent No.: US 12,618,977 B2
(45) Date of Patent: May 5, 2026

(54) OPTICAL DETECTION SYSTEM AND METHOD FOR DETECTING A HOSTILE OPTICAL COMPONENT

(71) Applicants: HENSOLDT Sensors GmbH, Taufkirchen (DE); HENSOLDT Optronics GmbH, Oberkochen (DE)

(72) Inventors: Oliver Rudow, Riemerling (DE); Lutz Hoering, Oberkochen (DE)

(73) Assignees: HENSOLDT Sensors GmbH, Taufkirchen (DE); HENSOLDT Optronics GmbH, Oberkochen (DE)

( * ) Notice: Subject to any disclaimer, the term of this patent is extended or adjusted under 35 U.S.C. 154(b) by 917 days.

(21) Appl. No.: 17/901,724

(22) Filed: Sep. 1, 2022

(65) Prior Publication Data

US 2023/0076107 A1      Mar. 9, 2023

(30) Foreign Application Priority Data

Sep. 3, 2021    (EP) .................................... 21194882
Nov. 5, 2021    (EP) .................................... 21206603

(51) Int. Cl.
| | |
|---|---|
| *G01S 17/88* | (2006.01) |
| *F41H 5/26* | (2006.01) |
| *G01S 7/481* | (2006.01) |
| *G01S 7/495* | (2006.01) |
| *G02B 26/10* | (2006.01) |

(Continued)

(52) U.S. Cl.
CPC ............ *G01S 17/88* (2013.01); *G01S 7/4814* (2013.01); *G01S 7/4817* (2013.01); *G01S 7/495* (2013.01); *G02B 26/101* (2013.01);

*G06V 10/70* (2022.01); *G06V 20/50* (2022.01); *F41H 5/266* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 5,600,434 A * | 2/1997 | Warm | ..................... | F41G 7/224 |
| | | | | 356/139.08 |
| 11,342,721 B1 * | 5/2022 | Lavine | .................. | H01S 3/0071 |

(Continued)

FOREIGN PATENT DOCUMENTS

| | | |
|---|---|---|
| DE | 9417451 U1 | 6/1995 |
| EP | 3514477 A1 | 7/2019 |

(Continued)

OTHER PUBLICATIONS

European Patent Office, Extended European Search Report, Application No. 21206603.9, dated Apr. 19, 2022, 12 pages.

*Primary Examiner* — Luke D Ratcliffe
(74) *Attorney, Agent, or Firm* — Mahamedi IP Law LLP

(57)      ABSTRACT

An optical detection system for detecting a hostile optical component without exposing the surrounding to unnecessary hazards is disclosed. The system comprises a laser unit configured to provide an adjustable laser beam along an optical path to scan for the optic component or to act as jammer by providing a target spoofing; a single aperture for the optical path; a detector configured to detect through the single aperture retroreflections of the laser beam at the optical component; and a camera for detecting through the single aperture potential candidates for the hostile optical component.

14 Claims, 3 Drawing Sheets

(51) Int. Cl.
    *G06V 10/70*        (2022.01)
    *G06V 20/50*        (2022.01)

(56)           References Cited

U.S. PATENT DOCUMENTS

| | | |
|---|---|---|
| 2008/0018520 A1 | 1/2008 | Moreau |
| 2009/0260511 A1 | 10/2009 | Melnychuk et al. |
| 2012/0068874 A1* | 3/2012 | Corella .................. G01S 7/495 |
| | | 342/14 |
| 2020/0232768 A1 | 7/2020 | Poplawski |
| 2022/0029732 A1* | 1/2022 | Rudow ................. H04K 3/827 |
| 2023/0033690 A1* | 2/2023 | Factor ................ F41H 13/0062 |

FOREIGN PATENT DOCUMENTS

| | | |
|---|---|---|
| EP | 3943875 A1 | 1/2022 |
| WO | 2007116403 A2 | 10/2007 |

* cited by examiner 50    165    60, 100 transmitting a laser beam through
the single aperture to scan for an
optic component or to act as jammer — S110 detecting retroreflections of the
laser beam at the optical component — S120 detecting potential candidates for
the hostile optical component — S130

OPTICAL DETECTION SYSTEM AND METHOD FOR DETECTING A HOSTILE OPTICAL COMPONENT

TECHNICAL FIELD

The present invention relates to an optical detection system and a method for detecting a hostile optical component and, in particular, to a non-detectable optic detection system providing limited hazard area.

BACKGROUND

Optic detection systems are laser-based systems designed to detect hostile optic components or systems by means of the detection of a retro-reflection signal coming back from hostile optical systems such as periscopes, weapon stations, riflescopes or equivalent systems. For this, the optic detection systems may scan a narrow continuous wave, CW, or pulsed modulated laser beam of a certain beam width over a certain space angle in a short time in order to find the hostile optical systems in a range of some kilometer distances.

The design of these optic detections systems shall find hostile optical systems in a large space angle (field of regard) and through longer distances in short time. The field of regard of such a system may cover as an example 90° to 120° in azimuth and 15° to 45° in elevation for a symmetric war scenario or even much more in an asymmetric conflict in an urban scenario. The distance range may run from a few 100 m (for example a hostile fire attack) up to several kilometers (for example a missile attack). The scanning time needed to find any hostile optical system within above defined space angle shall be a few seconds only or even better a fraction of a second. Such systems need huge laser power within wavelength bands such as VIS (visual spectral range), NIR (near infra-red) and/or SWIR (short wave infra-red) offering higher atmospheric transmission.

The sensitivity of the system detector shall be very high as the laser signal is running two times through the atmosphere starting from the optic detection system to the hostile optic systems and back to the detector. Consequentially, the retro-reflected signal to be detected may be for large distances several orders of magnitude lower than the laser signal emitted following a distance dependency that scales at least with distance to the power of minus 4 (here atmospheric attenuation is neglected).

Conventional optic detection systems as described above show the following drawbacks:

- appropriate lasers are non-eye safe lasers coming around with a hazard area of several 100 m or even more,
- these laser wavelengths are detectable by standard laser warner systems and thus the optic detection system is detectable when in operation,
- fast scanning prevents the system from an inherent false alarm reduction mechanism that would need longer integration times per angular direction (therefore, such systems may not be used when too many false alarms are detected which in turn results in an unacceptable workload/stress for the operator crew),
- a scanning electro-optical system providing high power laser and very sensitive detection capabilities at the same time have at least two apertures that is large in size and weight and, therefore, provides integration difficulties into a platform as the system requires an elevated position free of obstacles to cover the wide field of regard.

Therefore, there is a demand for an optic detection system that allows the integration into ground-based, flying or swimming platforms by means of a very compact design that is optimized in terms of size, weight and power (SWaP) and offers sufficient agility to demonstrate its performance under respective platform dynamic conditions.

BRIEF DESCRIPTION OF THE INVENTION

At least some of the above-mentioned problems are solved by an optical detection system according to claim 1 and a method for detecting according to claim 14. The dependent claims refer to further advantageous realizations for the subject matters of the independent claims.

The present invention relates to an optical detection system for detecting a hostile optical component without exposing the surrounding to unnecessary hazards. The system comprises a laser unit, a (single) aperture for an optical path, a detector, and a camera (e.g. a surveillance camera). The laser unit is configured to provide an adjustable laser beam along the optical path to scan for the hostile optical component or to act as a jammer by providing a target spoofing. The detector is configured to detect through the single aperture retroreflections of the laser beam at the hostile optical component. The camera is configured for detecting through the single aperture potential candidates for the hostile optical component. The detector may then verify the candidates.

Therefore, the laser unit irradiates a laser beam into the field of interest that eventually may be reflected by the optical component (e.g. by a lens or a glass panel). These retroreflection can be detected by the detector (or the camera) by analyzing the used frequency or signal signature or a signal modulation (e.g. a particular pulse pattern). The adjustments in the laser unit may relate to different parameters. Likewise, the camera may be suitable to capture images in different spectral ranges. It may operate in the visible spectrum. Optionally, the camera may likewise be sensitive in the infrared or in any other spectral ranges (e.g. to capture IR images).

For example, the laser unit may be configured to adjust a divergence of the laser beam to adapt an energy impact on an object in the optical path. Additionally or alternatively, the laser unit may be configured to select a wavelength of the laser beam to: reduce a scattering in atmosphere, especially by acting as a mid-infrared Band 1 laser, and/or to act as soft-kill countermeasure, especially by acting as Band 4a/4b laser. The spectral bands may be defined as follow: the visible spectrum (VIS) is approximately between 400 nm and 750 nm, the near infrared (NIR) is approximately between 750 nm and 950 nm, the short wave infra-red (SWIR) is approximately between 950 nm and 2.500 nm. In addition, eye safe laser bands are, e.g., about 1.500 nm or 2.500 nm.

The mid infrared band 1 laser has the advantage that it is not or barely scattered in the atmosphere so that this radiation cannot easily be detected by a third party. According to a further embodiment, the laser unit is configured to transform at least part of the band 1 laser radiation into the band 4a/4b laser radiation so the detection system may easily switch between a detection mode and a countermeasure mode.

According to embodiments, the divergency of the laser beam can be adjusted using an adaptive optics or lenses or other optical devices. The energy density within the laser beam may also be changed by a laser beam expander that changes—via multiple lenses—the width of the beam (to increase or decrease). It is understood that the selected divergency depends on the usage. For example, a laser utilized as jammer may have a smaller divergence whereas a laser utilized as scanner may have a larger divergence (e.g. to ensure an eye-safety). An optics detection for longer ranges may utilizes smaller beam divergence, whereas larger divergence of the laser allows for faster coverage of a larger angular search area in shorter range. According to embodiments, the adjustment of the divergence can be selected from a discrete set of classes (e.g. safety classes) or may be changed continuously (associated with a determined distance).

Optionally, the detector is configured to detect other laser sources, in particular to detect laser guided missiles. The detector may also provide directional or positional information of any detected other light or laser source. Likewise, the camera may be configured to detect the other light or laser sources and/or to determine its position or its direction of irradiation.

Optionally, the camera includes a multispectral camera suitable for a target identification and to enable a target tracking. Additionally or alternatively, the camera may be a 3D camera that is able to determine a distance between the optical detection system and the hostile optical component.

According to embodiments the camera may be configured to capture images in different wavelengths. The camera may, for example, include different imaging components that are sensible to different frequencies and may receive the image through mirrors or spectral beam splitters.

For this, the camera and/the detector may include a time-of-flight sensor or may track the other laser source over time to determine its distance (e.g. by a parallactic distance measurement). To facilitate this, the laser unit may transmit a pulsed laser including a train of pulses and the detector and/or the camera may be configured to measure a phase shift due to the travelled distance of the retroreflected signals to evaluate the distance to the optical component based on the measured phase shift.

Optionally, the optical detection system comprises a transparent dome head mounted to cover the single aperture. In addition, one or more mirrors may be mounted in the dome head and may be configured to achieve a coverage area for the optical path in at least one of following angular regions:

in azimuth: ±60°, ±90°, 360° surround view;
in elevation: ±10°, ±15°, up to 15°, up to 45°, up to 90°, up to 120°.

The mirror may be rotatable in a horizontal plane and may be tiltable so that the coverage area can extend also in the elevation angular direction. In particular, the mirror may represent a gimbal configured to cover not only the semi-hemisphere above the optical detection system, but also a certain angular range below a horizontal plane so that the coverage area is actually hyper-hemispherical. The mirror may or may not be present. Optionally, the single aperture, the laser unit, the detector and the camera are rotatable and tiltable together by utilizing a gimbal inside the transparent dome head to cover the above defined angular regions. Therefore, further embodiments include a gimbal or gimbal adapter to provide a desired coverage area by rotating the optional mirror or the single aperture, the laser unit, the detector and the camera as one unit.

Optionally, the optical detection system comprises one or more partial transparent mirrors configured to split the optical path into at least two or three sub-paths from the single aperture to the laser unit, to the detector, and to the camera.

Optionally, the optical detection system comprises a control unit. The control unit may be configured for at least one of the following:

adjusting the laser beam of the laser unit;
tilting and/or rotating the rotatable mirror to scan a desired coverage area;
processing of images captured by the camera;
processing detection signals of the detector;
implementing one or several artificial intelligence algorithms or other kinds of image processing methods utilizing images as recorded by the SAS by verifying potential hostile components in the recorded images as true hostile components due to detected retro reflections (therefore the verification hostile optical components by retro-reflections can be used as learning in an image processing of the SAS).

Optionally, the control unit is further configured to perform an object detection in the image(s) captured by the camera and, based thereon, to adjust the divergence of the laser beam.

Optionally, the optical detection system is coupled to at least one of the following components: a situational awareness system, SAS, a warner unit, a battle management system, additional sensors and/or effectors. For this coupling, the optical detection system may comprise interfaces to these components, wherein the interfaces may be wireless or wired or may be implemented by plugs or other detachable or temporary connections. The control unit may further be configured to make available or to forward data received from the detector unit or from the camera (or derived data therefrom) to the at least one component. The SAS may include a camera or other perceptional sensors that are able to capture a surrounding of the optical detection system.

According to further embodiments, the optical detection system may receive from the SAS information as context data about the surrounding and, based thereon, the control unit may control the laser unit and/or the mirror and/or the gimbal to scan a particular area in the surrounding of the detection system. Therefore, the optical detection system may in particular provide a context-based scanning. In addition to the SAS, also the warning unit and/or the battle management system may provide context data which, according to embodiments, will be used for the optical detection system to detect or to verify the hostile optical component.

Optionally, the control unit is configured to enable at least one of the following functions:

a laser-based countermeasure (e.g. utilizing the laser unit),
situational awareness functionalities (e.g. utilizing the camera),
laser-based communication by controlling the laser unit,
providing a ranging application to determine a distance to the optical component,
to control the laser unit in a time multiplexed manner so that the transmit laser signals are transmitted in different time slots than the received signals (the laser pulses will not interfere, because they propagate at different times instances).

Optionally, the control unit is further configured to adjust the divergence of the laser beam emitted by the laser unit based on a threat classification, wherein the threat classification may depend at least on the distance of the optical component. The threat-based divergency may be up to 10, 20, 30 or 50 mrad for a close range (e.g. less than a predetermined set value) or less than 1 mrad for larger distances (more than the set value). The set value may be 200 m or 300 m or 500 m or 1 km or any other value.

Further embodiments relate to an attachment suitable to be mounted on a periscope of a military vehicle, in particular a tank, with at least one optical detection system as described before.

Further embodiments relate to a method for detecting a hostile optical component without exposing the surrounding to unnecessary hazards. The method utilizes a system with a laser unit, a (single) aperture for an optical path, a detector, and a camera. The method comprises the steps:

transmitting an adjustable laser beam along the optical path through the single aperture to scan for the optic component or to act as jammer by providing a target spoofing;

detecting, by the detector unit through the single aperture, retroreflections of the laser beam at the optical component; and detecting, by a camera through the single aperture, potential candidates for the hostile optical component.

This method may include as further method steps all functions described before in conjunction with the optical detection system.

Embodiments solve at least some of the above-mentioned problems by providing several advantages:

The design of the system is built up in a way to allow—beside the mentioned reconnaissance application—one or more additional add-on applications such as laser-based countermeasures (e.g. Infrared (IR) Jamming and/or Dazzling, Damaging) and/or situational awareness functionalities (e.g. Ranging, Targeting and/or Tracking) and/or laser-based communication (e.g. by modulating the laser unit for information transmission and by demodulating signal received by the camera/detector). Embodiments achieve thus a major platform integration by providing an integration on an outstanding high-elevated location (e.g. on or in a periscope). The integration involves several electro-optical functionalities that need large field of regards free of any obstacles.

Additionally, embodiments offer sufficient logical interfaces such as interfaces following an open architecture standard, e.g. NGVA (NATO generic vehicle architecture). Additionally or alternatively, further sensors, effectors and/or the battle management system (BMS) may be integrated for the purpose of reducing scan times and false alarm rate by taking advantages from pre-screened and/or post-screened information from reconnaissance, situational awareness, BMS and/or alerts from warning sensor systems.

BRIEF DESCRIPTION OF THE FIGURES

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

Accordingly, while examples are capable of various modifications and alternative forms, the illustrative examples in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
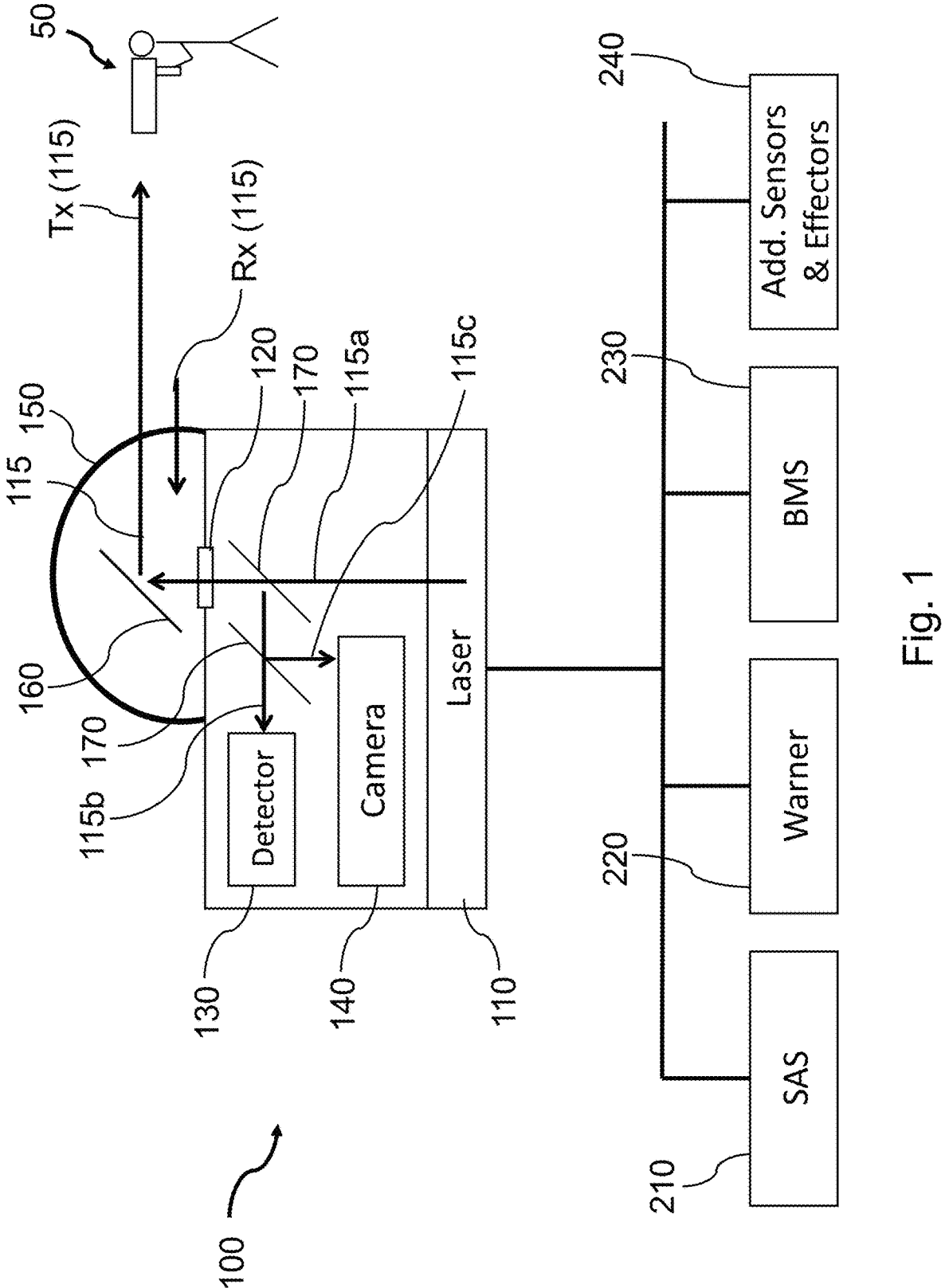
FIG. 1 depicts an optical detection system according to an embodiment of the present invention.

FIG. 1 depicts an optical detection system 100 for detecting a hostile optical component 50 (e.g. a riflescope) without exposing the surrounding to unnecessary hazards. The system 100 comprises a laser unit 110 configured to provide an adjustable laser beam or transmit signal Tx along an optical path 115. The laser beam Tx may be utilized to scan for the optic component 50 or to act as jammer by providing a target spoofing or to provide a laser-based communication. The system 100 further comprises a single aperture 120 for the optical path 115 and a detector 130 configured to detect through the single aperture 120 retroreflections or receive signal Rx of the laser beam Tx at the optical component 50. Finally, the system 100 includes a camera 140 for detecting through the single aperture 120 potential candidates for the hostile optical component 50.

The embodiment as depicted in FIG. 1 further includes a transparent optical head 150 with a mirror 160 which is configured to adjust the direction of the transmit signal Tx in a horizontal plane as well as with respect to the elevation (i.e. in a vertical direction). The mirror 160 may include a rotatable mirror which can be rotated in the horizontal plane and tilted relative to the horizontal plane. The system 100 of this embodiment further includes at least two partial transparent or semi-permeable mirrors 170 that split the receive signal Rx into three optical paths, a first path 115a back to the laser unit 110, a second path 115b to the detector 130, and a third path 115c to the camera 140.

It is understood that the mirror 160 is only one option to direct the laser beam in a desired direction. According to another embodiment, the whole system included the laser unit 110, the single aperture, the detector 130, and the camera 140 can be rotated together using a gimbal. The mirror 160 may then not be present. Therefore, according to further embodiments, the optical detection system 100 may include a gimbal or a gimbal adapter to direct the laser beam into a desired direction (coverage area).

Therefore, the receive signal Rx will first enter the optical head 150, it will be reflected by the mirror 160 and enters the single aperture 120. Thereafter, the receive signal Rx will partly be reflected at a first partial transparent mirror 170 and a transmission portion propagates to the laser unit 110. The reflected portion will be further split at a second partial transparent mirror 170 so that one transmitted portion will proceed to the detector 130 and a reflected portion to the camera 140. Therefore, when the laser unit 110 transmits the transmit signal Tx, it may pass through the first mirror 170 and subsequently through the single aperture 120 to the mirror 160 where it will be reflected into the scenery. Eventually, the transmit signal Tx will be retroreflected at the (hostile) optical component 50. Then, the retroreflected signal will propagate as a receive signal Rx back to the optical detection system 100, wherein it is reflected by the mirror 160 into the single aperture 120 and (partly) reflected by the first mirror 170. Subsequently, the receive signal Rx (or the remaining part thereof) is split by the second mirror 170 so that one portion is transmitted to the detector 130 and another portion is transmitted to the camera 140. The detector 130 will detect the retroreflection, whereas the camera 140 can provide an image depicted not only the reflection, but also the scenery around the optical component 50.

It is understood that the camera 140 may be configured to capture images from the scenery independently from the transmit signal Tx transmitted by the laser unit 110. It may also operate when the laser unit 110 is not operating. Likewise, it may capture images also from other regions where no transmit signal Tx is transmitted to.

According to embodiments, the optical detection system 100 is able to provide a time multiplexing with respect to the transmit signal Tx and the received signal Rx. For example, the laser unit 110 can transmit a train of light pulses which are transmitted into the scenery. The width of the light pulses and/or the frequency of the pulses may be arranged such that within a normal detection region (for example up to 10 km or 20 km), only a single pulse is propagating along the optical path so that only after the reception of the received signal Rx by the detector 130, another transmit signal is generated by the laser unit 110 and irradiated into the scenery. This provides the advantage that a single signal line can be used for the transmission signal and for the received signal. The time multiplexing will ensure that no interference can occur between the transmitted and received signals, Tx, Rx. Furthermore, the laser unit 110 may forward the transmit signal Tx also to the detector 130 so that the detector can mix the transmit signal Tx with the received signal Rx to determine a phase shift between both and to determine a distance information from the system 100 to the optical component 50. It is understood that this is only one possible way to determine a distance to the detected hostile optical component 50.

Further embodiments use other ways for distance measurement. By determining the distance to the potential objects of threat 50 it is possible to adjust a laser beam divergence based on the distance so that the potential hazard region is also decreased.

According to further embodiments, the optical detection system 100 is coupled to other components to enable a context-based scan of the surrounding. The additional components may include inter alia a situational awareness system, SAS 210, a warning unit 220, a battle management system, BMS 230, and other sensors and/or further effectors 240. These additional components may provide additional information to the optical detection system 100 so that the optical detection system 100 can adjust the scan based on the additional information provided by the additional components.

For example, the SAS 210 may include one or more cameras which will scan the surrounding and will provide instructions about the direction, where potential objects of interest or danger might be located. Similarly, the battle management system 230 may enable to provide further information about collaborating members with similar optical detection systems which may share information about the potential objects of danger in the surrounding. Thus, not each of the optical detection system has to scan for all optical components 50 but may obtain information (e.g. the position or direction) of already identified optical components 50. Similarly, the optical detection system 100 can receive data from warning units 220 that had already identified potential threats (like missiles or muzzle fire). Based on this context information, the optical detection system 100 may direct the scan into particular regions of interest. Finally, the additional sensors and effectors may provide further data to enable a queued search.

According to embodiments, the optical detection system 100 may include at least one dedicated interface for the SAS 210, the BMS 230 and/or a warning system 220. As a result, the performance of the whole system (e.g. in combination with collaborating participants) can be increased in terms of an optimization of the time for scanning a certain field of regard. With this, advantages can be taken from pre-screened information.

For example, the SAS 210 allows the optic detection system 100 to be run in full autonomous mode by realizing a context-based scanning commanded by the SAS 210. Such a context-based scanning can be realized by a sematic segmentation of video images of the SAS 210, wherein the images are divided into areas of interest and non-interest resulting in a structured horizon that may result in a substantial reduction of scanning time.

Furthermore, such a context-based scanning can be further optimized by the usage of operational information coming from the BMS 230 such as augmented reality data dividing the entire field of regard in enemy and friendly areas which reduces the scanning time again.

According to further embodiments, a prioritization of the scanning area can be additionally realized by at least one warning sensor 220 (such as missile, radar and/or laser warner) providing an alarm direction.

Figure 2:
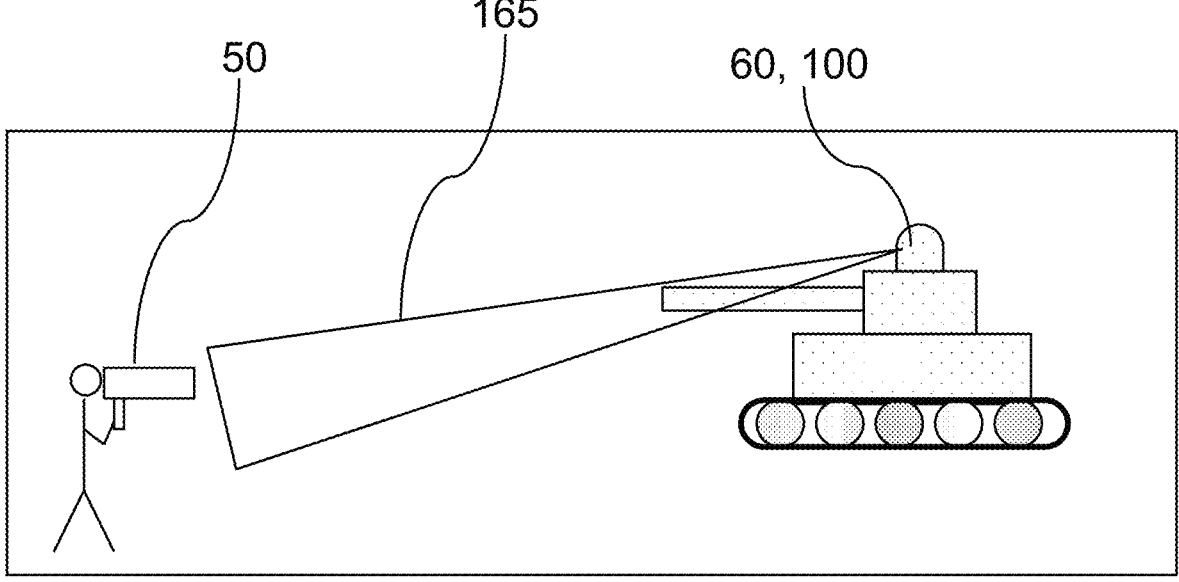
FIG. 2 depicts an application of the system of FIG. 1 in a periscope of an exemplary tank.

FIG. 2 depicts an embodiment for an attachment that is suitable to be mounted on a periscope 60 of a military vehicle such as the depicted tank and that includes an optical detection system 100. As described before, the integrated optical detection system 100 is configured to detect a hostile optical component 50 by retroreflections. The optical component 50 can be anything that reflects the transmit signal Tx. In particular, it may be a riflescope or a periscope or a weapon station for laser guided missiles or weapons or other optical reconnaissance devices.

In particular, embodiments of the optic detections system 100 are able to operate independent from the bore sight direction of the periscope and allow the scanning of very high elevation angles, e.g. when operated in urban scenarios. Therefore, such installations allow operation of the optic detection system 100 in a field of regard, FoR 165, that covers (almost) 360° in azimuth and typically 90°-110° in elevation (hyper-hemispheric FoR). In other words, a detection area 165 may also cover a region above and (partially) below a horizontal plane.

According to further embodiments, the laser unit 110 is provided by a Mid-IR Band 1 Laser to be unrecognizable by third parties. This effect is achieved by the fact that the mid-IR wavelengths are much less scattered in air and thus much less detectable from the side—especially when taking into account the already existing natural background radiation.

Furthermore, for the purpose of integrating a MID-IR Jammer and/or Dazzler into an exemplary turret, the laser unit 110 may be configured to convert a fraction of the Mid-IR Band 1 Laser into the Band 4a/b spectrum with the result that a soft-kill countermeasure can be initiated into the direction of a potential threat, which were identified by the optic detection system 100 in a very short time through the same hardware.

According to further embodiments, the laser subsystem (laser unit 110) may comprise a multi-wavelength laser-source or may couple to such a source and may be characterized to transmit a laser signal or realize an optic detection by a specific wavelength that fits into an atmospheric transmission band, is not detectable by market available standard laser warn-
       ing systems, is more eye-safe, and is scalable towards mid-wave infrared applications (MID
       IR).

According to further embodiments, besides or instead of jamming and/or dazzling, the optic detection system 100 can integrate a Laser Communication functionality as another feature, wherein the laser unit 110 acts as transmitter of transmit signals Tx and the detector 130 acts as receiver in this communication. The communication can be carried out with other collaborating (friendly) participants that have installed also an optical detection system as described herein or other laser communication devices. For this, the modulation of the laser unit 110 will be adjusted accordingly to encode information into the transmit signal Tx or to decode information from the receive signal Rx.

Embodiments allow a very compact design. In particular, the optical detection system 100 may include or represent a small optical gimbal system that is small and is sufficiently light to be mounted, for example, on top of a periscope on a land vehicle to end up with the elevated position free of obstacles (see FIG. 2).

Advantages aspects of embodiments can be summarized as follows:

The Optic Detection System 100 may be designed an optical head with one single aperture 120, only. The high-power laser signal Tx is transmitted and the retro-reflected signal Rx is detected through above-mentioned aperture 120. Additionally, the camera 140 may be a multi-spectral camera which is looking through this aperture 120 to image the scene for the purpose of target tracking, for example. The center axes of the laser-beam, the retro-reflection detector 130 and the field of view of the camera 140 may be aligned with each other in a way that the transmitted signal Tx and the received signal Rx are directed to the bore sight of the camera 140 with an alignment error much smaller than the tracking error.

A particular advantage of embodiments relates to the fact that the laser unit 110, the detector 130 and the camera 140 may be realized by a compact and high agile gimbal 160 installed underneath a transparent dome 150 while the laser unit 110, the retro-reflection detector 130 and the camera 140 are installed fixed with respect to the platform. The rotatable mirror or the gimbal offers sufficient bandwidth to stabilize the bore sight on a dynamical target with the tracking error that is only a fraction of the laser beam width (e.g. $\frac{1}{10}$). This tracking error is kept at 95% (almost completely) over time even in case the carrying platform (the tank e.g.) and the target are under dynamic movements.

According to further embodiments, the laser unit 110 is able to transmit high power laser signals Tx and the detector 130 is able to detect very low power signals such as the retro-reflected signals Rx by means of an intelligent optical design (i.e. by ghost image reduction) and time-domain multiplexing in order to transmit without interference the transmission signal Tx and the receive signal Rx through one coaxial channel, for example.

According to further embodiments, the optical detection system 100 allows the implementation of a laser ranging application that is able to range in a distance from e.g. 50 m towards several kilometers (e.g. up to 3 km, 5 km or 10 km or more). The ranging application can be utilized for an estimation of a target distance found by the optic detection system 100. In addition, the ranging application can be used to geo-reference identified target(s) by considering the platforms own position. To do so, the embodiment may be equipped with an inertial measurement unit. In a further embodiment, the inertial data may be given by the platform. According to another embodiment, the ranging application can be used to adjust a laser divergence for a smart laser energy management.

According to further embodiments, the mentioned laser energy management may be adapted to cover of different threats as apparent in different range regimes and under different operational conditions while keeping a needed laser power and with this a laser hazard area low. For example, retro-reflections from rifle scopes, unmanned aerial vehicle (UAVs) or snipers are typically expected in close range scenarios under eventually higher evaluation angles, whereas reflections from weapon stations or from sights of foreign tanks are expected under more flat angles in a higher distance. Taking this threat classification into account, embodiments adjust the laser divergence automatically or by an operational configuration to be some few 10 mrad in close range scenarios and a fraction of one mrad for scenarios in a few kilometer distances.

According to further embodiments, the adaptive laser divergence adjustment as well as all the reduction effort in scanning time enables a reduction of a laser beam divergence and, with this, a reduction in laser power which ends up in a minimization of the laser hazard area which is a key prerequisite for an operational usability. For example, an optimization of the hazard distance of at least a factor of 5 can be achieved, when taking benefit from SAS 210, BMS 230 and warning sensors 220.

When the BMS 230 is connected to the optic detection system 100, embodiments allow a coordinated operation mode of the optic detection system 100 with several other optic detections systems of an associated tank group, for example. Each optic detection system may scan a fraction of the large field of regard within a commanded segment in order to withstand an operation in a load attack such as a multi UAV attack.

Another advantage of interfacing the optic detection system 100 with a sensor-effector network is given by a context-based alarm confirmation which enables a substantial false alarm reduction. According to embodiments, the surrounding scene of any detected retro-reflection can automatically be analyzed by means of image processing or image analysis algorithms. For example, an artificial intelligence algorithm may utilize respective images as recorded by the SAS 210 when the optic detection systems 100 gives alarm due to a retro reflection. Therefore, embodiments can reject clear false alarms and can confirm correct alarms.

According to further embodiments, the optical detection system 100 includes a control unit, which is configured to control one or more of the following components: the laser unit 110, the mirror/gimbal 160, the camera 140, the detector 130 etc. to implement at least one of the above-mentioned functions of the optical detection system 100.

Figure 3:
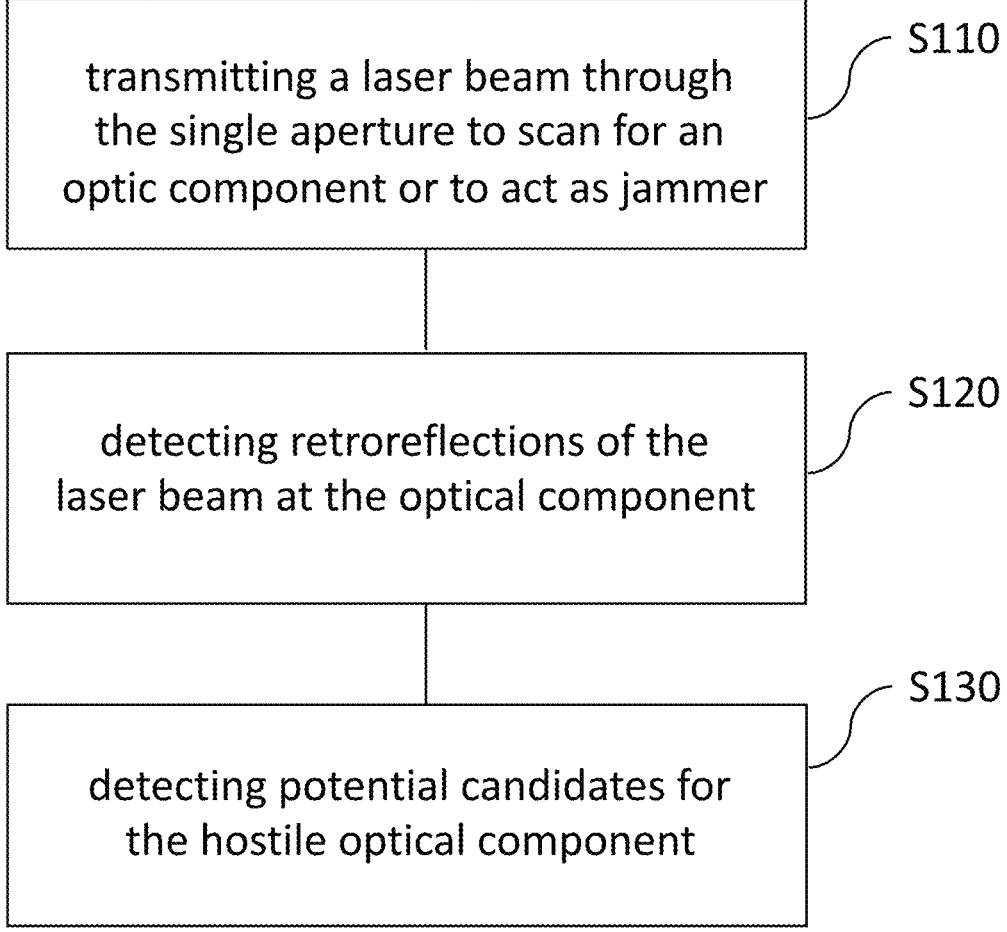
FIG. 3 shows a schematic flow chart of a method for detecting an optical component according to embodiments.

FIG. 3 shows a schematic flow chart of a method for detecting an optical component 50 according to embodiments. The method may utilize a system 100 of FIG. 1 that includes a laser unit 110, a single aperture 120 for an optical path 115, a detector 130, and a surveillance camera 140. The method comprises (at least) the steps of:

transmitting S110 an adjustable laser beam Rx along the optical path 115 through the single aperture 120 to scan for the optic component 50 or to act as jammer by providing a target spoofing;

detecting S120, by a detector unit 130 through the single aperture 120, retroreflections Rx of the laser beam at the optical component 50; and detecting S130, by a surveillance camera 140 through the single aperture 120, potential candidates for the hostile optical component 50.

It is understood that all functions described in conjunction with the optical detection system can be implemented by further method steps.

Embodiments provide the following advantages:

a low-SWaP like design with a high integration of an optic detection system 100;

an add-on soft-kill countermeasure and/or a laser communication through one optical aperture using hardware and software commonly;

provide more functionality than the sum of the functions of each individual system (multi-purpose solution);

the optic detection is unrecognizable to third parties (reconnaissance not possible);

the integration of the optic detection in a sensor-effector-information network optimizes the system in terms of scanning time;

laser power needs and a laser hazard range are reduced;

the network solution provides an efficient and automatic false alarm reduction;

a fully autonomous system is achievable;

an operator workload is reduced and a usability of such a system is increased.

The description and drawings merely illustrate the principles of the disclosure. It will thus be appreciated that those skilled in the art will be able to devise various arrangements that, although not explicitly described or shown herein, embody the principles of the disclosure and are included within its scope.

LIST OF REFERENCE SIGNS 50 (hostile) optical component
60 periscope

12

110 laser unit
115 optical path
120 single aperture
130 detector
140 surveillance camera(s)
150 dome head
160 rotatable/tiltable mirror(s) or gimbal
165 coverage area or filed of regard
170 (partial transparent) mirror(s)
210 situational awareness system
220 warning device
230 battle management system
240 sensors and/or effectors
Tx transmit signal(s)
Rx receive signal(s)

What is claimed is:

1. An optical detection system for detecting a hostile optical component without exposing the surrounding to unnecessary hazards, the system comprising:

a laser unit configured to provide an adjustable laser beam along an optical path to scan for the optic component or to act as jammer by providing a target spoofing;

a single aperture for the optical path;

a detector configured to detect through the single aperture retroreflections of the laser beam at the hostile optical component;

a camera for detecting through the single aperture potential candidates for the hostile optical component; and a control unit, the control unit being configured to: (i) determine a distance between the optical detection system and the optical component; (ii) utilize the laser unit for a laser-based countermeasure, and (iii) adjust the divergence of the laser beam, based on the determined distance, to minimize a laser hazard area for the laser beam.

2. The optical detection system according to claim 1, wherein the laser unit is configured to adjust a divergence of the laser beam to adapt an energy impact on an object in the optical path.

3. The optical detection system according to claim 1, wherein the laser unit is configured to select wavelengths of the laser beam to:

reduce a scattering in atmosphere, by acting as a mid-infrared Band 1 laser, and/or act as soft-kill countermeasure, especially by acting as Band 4a/4b laser.

4. The optical detection system according to claim 1, wherein the detector is configured to detect other laser sources, in particular to detect laser guided missiles.

5. The optical detection system according to claim 1, wherein the camera includes a multispectral camera suitable for a target identification and to enable the target tracking.

6. The optical detection system according to claim 1, further comprising:

a transparent dome head mounted to cover the single aperture; and a mirror mounted in the dome head and configured to enable a coverage area for the optical path in at least one of following angular regions:

in azimuth: ±60°, ±90°, 360° surround view in elevation: ±10°, ±15°, up to 15°, up to 45°, up to 90°, up to 120°.

7. The optical detection system according to claim 1, further comprising one or more partial transparent mirrors configured to split the optical path into three sub-paths between the single aperture and the laser unit, the detector, and the camera.

8. The optical detection system according to claim 1, wherein the control unit is further configured for at least one of the following:

tilting and rotating the mirror mounted in the dome head to scan a desired coverage area;

processing of images captured by the camera;

processing detection signals of the detector;

implementing an artificial intelligence algorithm or other kinds of image processing methods utilizing images as recorded by the SAS by verifying potential hostile components in the recorded images as true hostile components due to detected retro reflections.

9. The optical detection system according to claim 8, wherein the control unit is further configured to perform an object detection in the images captured by the camera and, based thereon, to adjust the divergence of the laser beam.

10. The optical detection system according to claim 8, wherein the system is configured to at least one of the following components:

a situational awareness system, SAS, a warner unit, a battle management system, additional sensors and/or effectors, wherein the control unit is further configured to make available data from the detector unit or from the camera or derived data therefrom to the at least one component; and/or wherein the control unit is further configured to receive context data about the scenery from the at least one component to provide a search for the optical component or other objects based on the received context data.

11. The optical detection system according to claim 8, wherein the control unit is further configured to enable at least one of the following functions:

situational awareness functionalities, laser-based communication by controlling the laser unit, providing a ranging application to determine a distance to the optical component, to control the laser unit in a time multiplexed manner so that the transmit laser signals are transmitted in different time slots than the received signals.

12. The optical detection system according to claim 11, wherein the control unit is further configured to adjust the divergence of the laser beam emitted by the laser unit based on a threat classification, wherein the threat classification depends at least on the distance of the optical component.

13. An apparatus suitable to be mounted on a periscope of a military vehicle, in particular a tank, comprising:

an optical detection system for detecting a hostile optical component without exposing the surrounding to unnecessary hazards, the system comprising:

a laser unit configured to provide an adjustable laser beam along an optical path to scan for the optic component or to act as jammer by providing a target spoofing;

a single aperture for the optical path;

a detector configured to detect through the single aperture retroreflections of the laser beam at the hostile optical component;

a camera for detecting through the single aperture potential candidates for the hostile optical component, and a control unit, the control unit being configured to: (i) determine a distance between the optical detection system and the optical component; (ii) utilize the laser unit for a laser-based countermeasure, and (iii) adjust the divergence of the laser beam, based on the determined distance, to minimize a laser hazard area for the laser beam.

14. A method for detecting a hostile optical component without exposing the surrounding to unnecessary hazards by utilizing a system with a laser unit, a single aperture for an optical path, a detector, and a camera, the method comprising:

transmitting an adjustable laser beam along the optical path through the single aperture to scan for the optic component or to act as jammer by providing a target spoofing;

detecting, by a detector unit through the single aperture, retroreflections of the laser beam at the optical component; and detecting, by a camera through the single aperture, potential candidates for the hostile optical component;- determining, by a control unit, a distance between the optical detection system and the optical component;

utilizing, by the control unit, the laser unit for a laser-based countermeasure; and adjusting, by the control unit, the divergence of the laser beam of the laser unit, based on the determined distance, to minimize a laser hazard area for the laser beam.

* * * * *